United States Patent
Acharyya

(10) Patent No.: US 8,229,195 B2
(45) Date of Patent: Jul. 24, 2012

(54) METHOD AND SYSTEM FOR VERIFYING DETECTION OF A LUNG NODULE

(75) Inventor: Mausumi Acharyya, Bangalore (IN)

(73) Assignee: Siemens Information Systems, Ltd., Bangalore (IN)

( * ) Notice: Subject to any disclaimer, the term of this patent is extended or adjusted under 35 U.S.C. 154(b) by 538 days.

(21) Appl. No.: 12/540,121

(22) Filed: Aug. 12, 2009

(65) Prior Publication Data

US 2010/0040269 A1 Feb. 18, 2010

Related U.S. Application Data

(60) Provisional application No. 61/089,126, filed on Aug. 15, 2008.

(51) Int. Cl.
*G06K 9/00* (2006.01)
(52) U.S. Cl. .......................... 382/128; 382/130; 382/131
(58) Field of Classification Search .................. 382/131, 382/128, 129, 130, 132, 133
See application file for complete search history.

(56) References Cited

U.S. PATENT DOCUMENTS

| | | | | |
|---|---|---|---|---|
| 5,668,888 A * | 9/1997 | Doi et al. | ....................... | 382/132 |
| 6,694,046 B2 * | 2/2004 | Doi et al. | ....................... | 382/130 |
| 7,274,810 B2 * | 9/2007 | Reeves et al. | ................. | 382/128 |
| 8,045,770 B2 * | 10/2011 | Reeves et al. | ................. | 382/128 |
| 8,050,481 B2 * | 11/2011 | Reeves et al. | ................. | 382/131 |
| 2009/0080748 A1 * | 3/2009 | Reeves et al. | ................. | 382/131 |

* cited by examiner

*Primary Examiner* — Vikkram Bali
*Assistant Examiner* — Nancy Bitar
(74) *Attorney, Agent, or Firm* — Francis G Montgomery

(57) ABSTRACT

Detected lung nodules are presented in a chest radiographic sub-image. A curve is matched to pixels in the sub-image and confidence values for individual pixels is determined. A confidence image is generated consisting of the confidence values at the position of the respective pixel. Separated regions of pixels within the confidence image are identified which have a confidence value greater than a threshold confidence value. A filtered confidence image is generated consisting of the separated regions of the confidence image which are larger than a threshold area. A histogram of values characteristic for the matching of the curve is determined, wherein the filtered confidence image is used as a mask, such that only values are considered for the histogram which correspond to the separated regions of the filtered confidence image. A statistical measure of the histogram is determined and the lung nodules are verified based on the statistical measure.

20 Claims, 10 Drawing Sheets

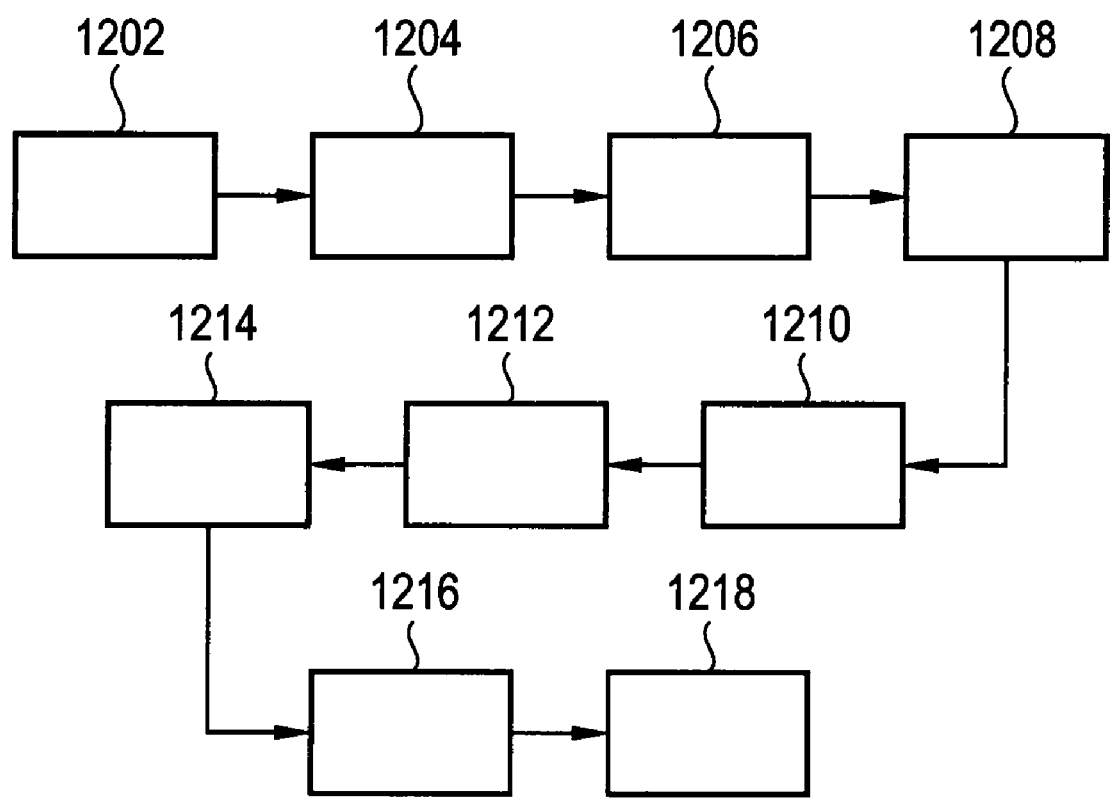

METHOD AND SYSTEM FOR VERIFYING DETECTION OF A LUNG NODULE

CROSS-REFERENCE TO RELATED APPLICATION

The present application claims the benefit of U.S. provisional application No. 61/089,126 filed Aug. 15, 2008, the entire contents of which are herein incorporated by reference

FIELD OF INVENTION

The present invention relates to medical image analysis, particularly a method and system for verifying detection of a lung nodule in a chest radiographic image.

BACKGROUND OF INVENTION

Typical chest X-ray (CXR) data is a two-dimensional (2D) projection image; each pixel represents a volumetric integration. Due to human anatomy there are many lung structures which can be falsely identified as nodules in projection data. One such structure is a rib-cross, which appears when the anterior and posterior ribs overlap each other. These rib-cross areas are often falsely identified as nodules and pose problems for Computer Aided Diagnosis (CAD) systems.

The lungs are situated within the rib cage, which is basically a bone structure. The bones absorb X-rays to a greater extent than do soft tissues, and hence these appear as white stripes across the X-ray radiograph. The ribs curl around the body and consequently the rib shadow on the X-ray radiograph appear to cross each other. The cross-over points appear as a pattern. This pattern may disguise the shadows cast by nodules which may be aligned with the crossover points.

For effective diagnostics, the regions in the X-ray image which are identified as possible nodules should be verified to ascertain whether they are actually nodules or false positives. The occurrence of false positives, where some other feature such as a rib crossing shadow is mistakenly identified as being attributed to a nodule, should be minimized. When scanning the lung region of posterior/anterior X-ray images to look for regions of varying contrast or edges, a large number of candidate regions turn out to be rib crossings and the like. Hence there should be a mechanism to cross-check or verify the identified nodules.

SUMMARY OF INVENTION

In view of the foregoing, an embodiment herein includes a method for verifying detection of a lung nodule in a chest radiographic image, comprising:
(a) providing a sub-image of the chest radiographic image, wherein the sub-image contains a detected nodule;
(b) matching a curve to a plurality of pixels in the sub-image;
(c) determining a confidence value for individual pixels in the plurality of pixels in the sub-image, wherein the confidence value for each individual pixel represents how well the curve is matched to the individual pixel;
(d) generating a confidence image consisting of the confidence values at the position of the respective individual pixel;
(e) identifying separated regions of pixels within the confidence image which have a confidence value greater than a threshold confidence value;
(f) generating a filtered confidence image consisting of the separated regions of the confidence image which are larger than a threshold area;
(g) determining a histogram of values characteristic for the matching of the curve wherein the filtered confidence image is used as a mask, such that only values are considered for the histogram which correspond to the separated regions of the filtered confidence image;
(h) determining at least one statistical measure of the histogram; and
(i) verifying the detection of the lung nodule based on the at least one statistical measure.

In another embodiment the said object is achieved by providing a method for verifying detection of a lung nodule in a chest radiographic image, comprising:
(a) providing a sub-image of the chest radiographic image, wherein the sub-image contains a detected nodule;
(b) matching a curve to a plurality of pixels in the sub-image;
(c) determining a confidence value for individual pixels in the plurality of pixels in the sub-image, wherein the confidence value for each individual pixel represents how well the curve is matched to the individual pixel;
(d) generating a confidence image consisting of the confidence values of the orientation values at the position of the respective individual pixel;
(e) identifying separated regions of pixels within the confidence image which have a confidence value greater than a threshold confidence value;
(f) generating a filtered confidence image consisting of the separated regions of the confidence image which are larger than a threshold area;
(g) determining a histogram of the filtered confidence image;
(h) determining at least one statistical measure of the histogram; and
(i) verifying the detection of the lung nodule based on the at least one statistical measure.

Another embodiment includes a system for verifying detection of a lung nodule in a chest radiographic image, comprising:
(a) a candidate generator for providing a sub-image of the chest radiographic image, wherein the sub-image contains a detected nodule;
(b) a matching module for matching a curve to a plurality of pixels in the sub-image;
(c) a processor for determining a confidence value for individual pixels in the plurality of pixels in the sub-image, wherein the confidence value for each individual pixel represents how well the curve is matched to the individual pixel;
(d) a generator for generating a confidence image consisting of the confidence values at the position of the respective individual pixel;
(e) an identifier for identifying separated regions of pixels within the confidence image which have a confidence value greater than a threshold confidence value;
(f) a filter for generating a filtered confidence image consisting of the separated regions of the confidence image which are larger than a threshold area;
(g) an analyzer for determining a histogram of values characteristic for the matching of the curve wherein the filtered confidence image is used as a mask, such that only values are considered for the histogram which correspond to the separated regions of the filtered confidence image;

(h) determining module for determining at least one statistical measure of the histogram; and (i) a verifier for verifying the detection of the lung nodule based on the at least one statistical measure of the histogram.

BRIEF DESCRIPTION OF THE DRAWINGS

The present invention is further described hereinafter with reference to illustrated embodiments shown in the accompanying drawings, in which:

FIG. 12 illustrates a system for verifying a detection of a lung nodule in a chest radiographic image according to an embodiment of the invention.

DETAILED DESCRIPTION OF INVENTION

Chest X-ray images, typically being projection data, are difficult to analyze; it is often difficult to distinguish between rib-cross and non rib-cross regions. An embodiment of the invention makes use of the appearance of ribs or/and rib-crosses in the X-ray image. The ribs have a certain shape which can locally be matched with a curve. Rib-crosses show up in a close pattern within a region which can easily be distinguished in the image. By using a mask based on this geometric pattern one can focus image analysis on the relevant areas. A histogram of an image with values characteristic for the matching of the curve then provides a reliable basis to detect a rib-cross and hence false positives.

Figure 1:
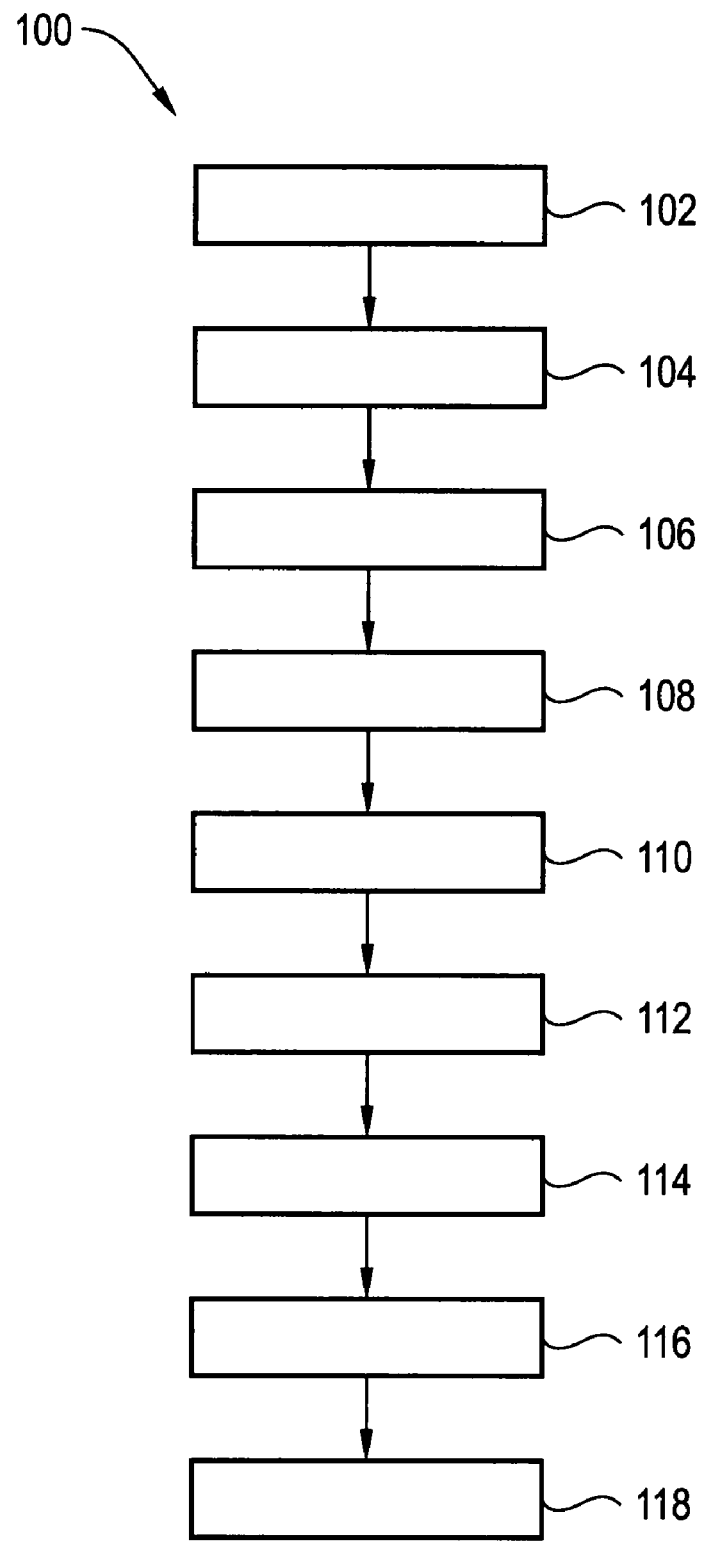
FIG. 1 illustrates a flowchart explaining a method for verifying a detection of a lung nodule in a chest radiographic image based on an embodiment of the invention.

FIG. 1 illustrates a flowchart 100 explaining a method for verifying a detection of a lung nodule in a chest radiographic image based on an embodiment of the invention. First of all, local regions called candidate locations are identified as probable suspicious nodule regions. Each candidate point could be represented by an ellipse with a minor and major axis that gives the spread of the probable nodule. Corresponding to every candidate point a sub-image is chosen. For example, a bounding box or window could be drawn around the ellipse to have a sub-image. The method starts by getting these sub-images for verification as shown in step 102. A sub-image of the chest radiographic image contains a probable detected nodule. It is to be identified whether the probable detected nodule is a false positive, i.e. whether it is something else, for example a rib-cross section, which is detected as an actual nodule.

Figure 2:
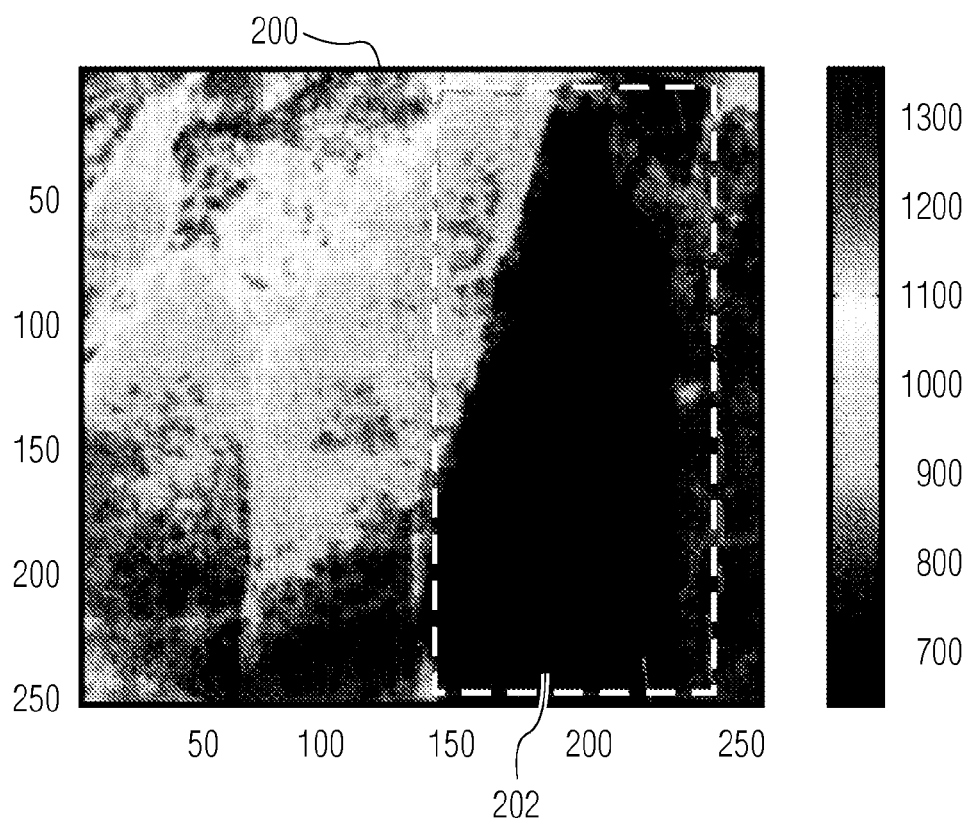
FIG. 2 represents a sub-image having a rib-cross.
Figure 3:
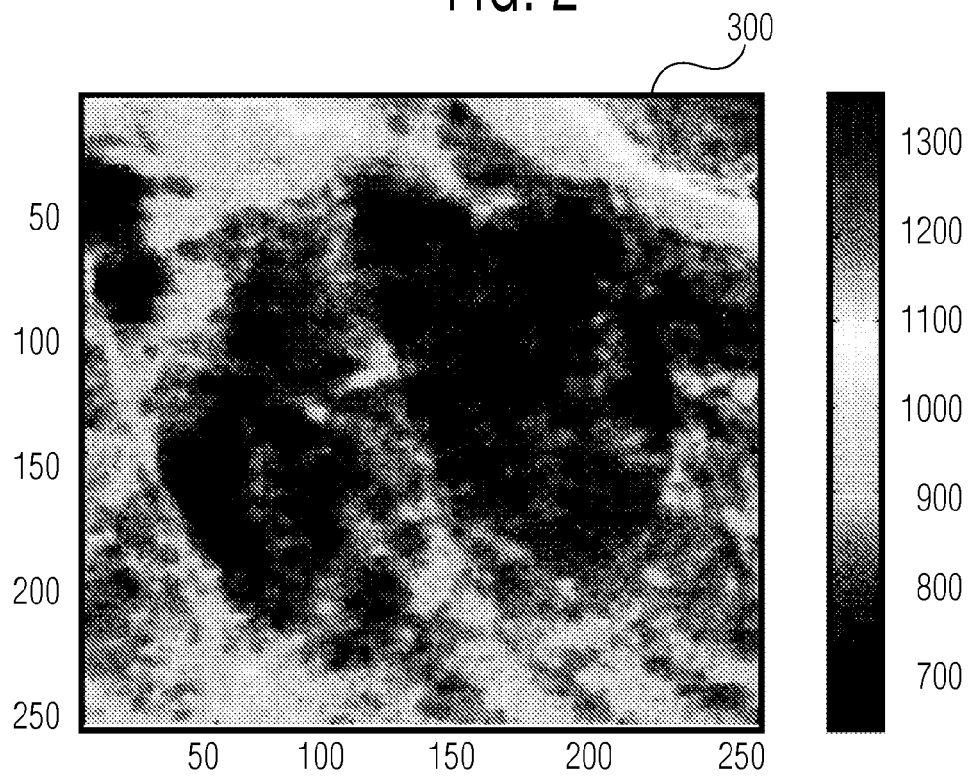
FIG. 3 represents a sub-image which does not have a rib-cross.

The main structure we are interested in our example verification is a rib-cross, even though the same methodology could be extended to other misrepresented parts. For a further description of the method, two images are considered. FIG. 2 represent a sub-image 200 having a rib-cross 202 and FIG. 3 represent another sub-image 300, which does not have a rib-cross, but has a pattern based on the underlying organ or the tissues. To start with the process, each sub-image is treated as having an oriented pattern. In the case of a rib-cross the oriented pattern would be different from non rib-cross regions. At least one embodiment of the invention aims to present some unique rib-cross features based on curvature properties. Two model functions which locally model oriented patterns are used in the method. One is a straight line model and the other is a parabolic curvature model. Other models could also be used for the characterization of these types of oriented patterns. These two specific models are basically considered, since the ribs appear locally within a region of interest as a straight line or a slightly bent parabola.

At step 104, a curve is matched to each pixel of the sub-image. The matching of the curve with each pixel is carried out based on two types of model functions, i.e. straight line model and the parabolic curvature model, even though other models could also be used for the characterization of these types of oriented patterns. The said matching is done between a curve and individual pixels, together with the neighborhood of each pixel. To perform the said matching, the sub-image may be converted to a gradient image if required to have a clear differentiation in intensities of the neighboring pixels. When the resemblance between a model and a local image is high, the corresponding model parameters, for example orientation and curvature, yield a reliable description of the local image. The matching of the curve based on the said models with the pixels would yield statistical features for example, confidence values which could be represented using feature maps. By comparing these statistical features of various models, one can find out which model describes the local pattern best. The straight-line model requires less computation whereas the parabolic model more closely corresponds to the actual shape of the ribs and hence allows a more accurate matching of the curve.

At step 106, the method involves determining a confidence value for every pixel of the sub-image. The confidence value represents how well the curve is matched to each pixel in the sub-image. For a better understanding, the concepts of oriented pattern, straight line model, and parabolic curvature model are described here.

Consider an oriented pattern f(x, y) representing a local image described in terms of a model function u(x y, a). The confidence with which f(x, y) is described by the model function u(x, y, a) is measured by decomposing the derivative (gradient) energy of f(x, y) into two contributions, one parallel and one perpendicular to the normalized differential field (gradient) of u(x, y, a). This results in the fit energy $E_f(a)$ and residual energy $E_{r(a)}$ $$E_f(a) = \int\int \left(\nabla f \cdot \frac{\nabla u(a)}{\|\nabla u(a)\|}\right)^2 dxdy \qquad (1)$$

$$E_r(a) = \int\int \left(\nabla f \cdot \frac{\nabla u(a)_\perp}{\|\nabla u(a)\|}\right)^2 dxdy$$

Subscript ⊥ represents 90° rotation of the vector. Comparison of the fit energy with the residual energy gives a measure of the model fit.

In absence of any a priori knowledge to interpret the difference between the fit and the residual energy, the difference energy normalized with the total gradient energy is described as a quality measure (confidence) c(a).

$$c(a) = \frac{E_f(a) - E_r(a)}{E_f(a) + E_r(a)} \quad -1 \le c \le 1 \qquad (2)$$

The value of c(a) varies from −1 for a pattern of which the isophotes are exactly perpendicular to those of the model function u(x, y, a) and +1 for a pattern which is exactly described by the model function.

When considering a straight line model, the straight line model function is given by $$u(x,y,\phi) = x\cos\phi + y\sin\phi \qquad (3)$$

φ is the orientation perpendicular to the model isophotes (tangential).

The fit energy $E_f$ and confidence c is described as $$E_f(\phi) = \frac{1}{2}(\overline{f_x^2} + \overline{f_y^2}) + \frac{1}{2}(\overline{f_x^2} - \overline{f_y^2})\cos 2\phi + \frac{1}{2}\overline{2f_xf_y}\sin 2\phi \qquad (4)$$

$$c(\phi) = \frac{1}{(\overline{f_x^2} + \overline{f_y^2})}\left((\overline{f_x^2} - \overline{f_y^2})\cos 2\phi + \overline{2f_xf_y}\sin 2\phi\right) \qquad (5)$$

The gradient based orientation estimator is given by $$\phi = \frac{1}{2}\arctan\frac{\overline{2f_xf_y}}{\overline{f_x^2} - \overline{f_y^2}} \qquad (6)$$

A bar (•) above a quantity denotes an averaged quantity. The subscripts x and y indicate partial derivatives in the direction of the respective coordinate.

When considering a parabolic curvature model, the parabolic curvature model is represented by $$u(x, y, \phi, \kappa) = \frac{1}{2}\kappa w^2 - v \qquad (7)$$

κ is the curvature and gauge coordinates are $$v = x\cos\phi + y\sin\phi \quad w = -x\sin\phi + y\cos\phi \qquad (8)$$

Minimization of the residual energy $E_r$ gives the curvature. To speed up the process of calculation of curvature approximate $E_f$ and $E_r$ are defined as $$\hat{E}_f(\kappa) = \frac{\overline{\kappa^2 w^2}\,\overline{f_w^2} - 2\overline{\kappa w f_w f_v} + \overline{f_v^2}}{1 + \overline{\kappa^2 w^2}} \qquad (9)$$

$$\hat{E}_r(\kappa) = \frac{\overline{\kappa^2 w^2}\,\overline{f_v^2} - 2\overline{\kappa w f_w f_v} + \overline{f_w^2}}{1 + \overline{\kappa^2 w^2}}$$

Curvature κ and confidence c are defined as $$\hat{\kappa} = \frac{\overline{w^2 f_v^2} - \overline{w^2} \cdot \overline{f_w^2} - \sqrt{\left(\begin{array}{c}4\overline{w^2} \cdot \overline{w f_w f_v}^2 + \\ (-\overline{w^2 f_v^2} + \overline{w^2} \cdot \overline{f_w^2})^2\end{array}\right)}}{2\overline{w^2} \cdot \overline{w f_w f_v}} \qquad (10)$$

$$\hat{c}(\phi, \kappa) = \frac{\hat{E}_f(\phi, \kappa) - \hat{E}_r(\phi, \kappa)}{\hat{E}_f(\phi, \kappa) + \hat{E}_r(\phi, \kappa)} \qquad (11)$$

A hat (•̂) above a quantity indicates approximation.

Figure 4:
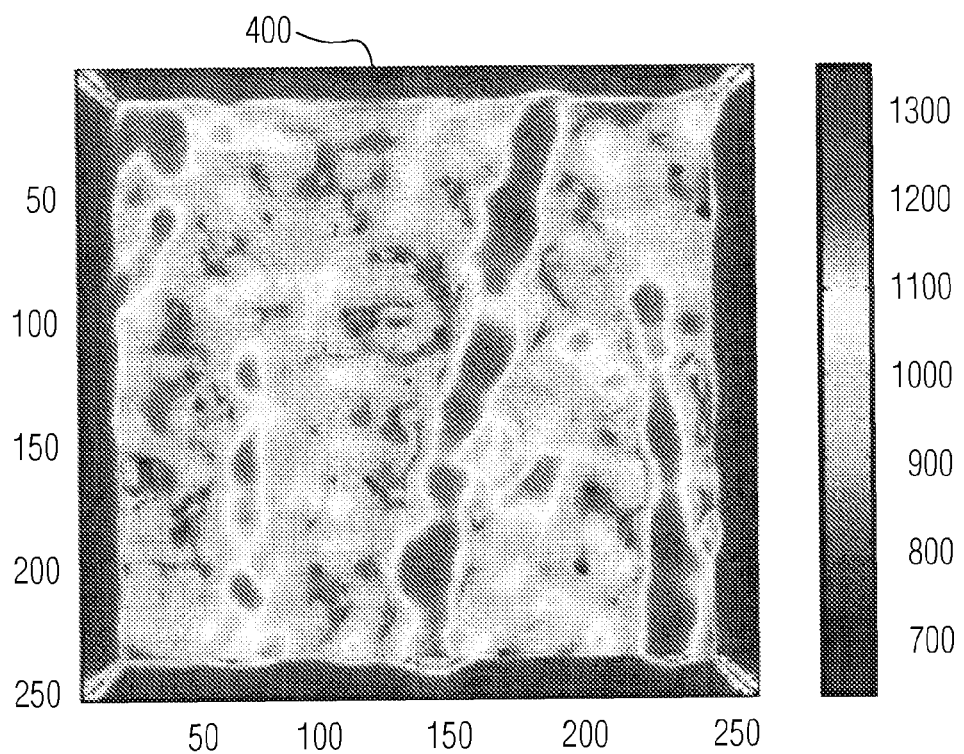
FIG. 4 represents a confidence image of the sub-image as shown in FIG. 2, having a rib-cross.
Figure 5:
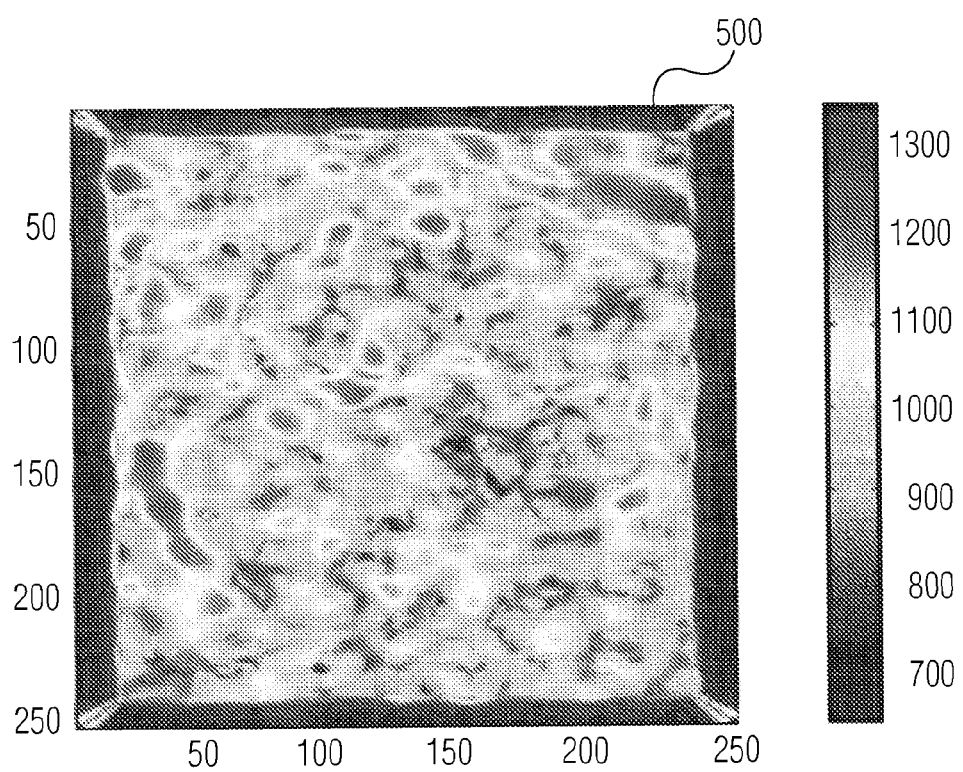
FIG. 5 represents a confidence image of the sub-image as shown in FIG. 3, which does not have a rib-cross.

At step 108, a confidence image is generated consisting of the confidence values at the position of the respective pixel of the sub-image. FIG. 4 represents the confidence image 400 of the sub-image 200 and FIG. 5 represents the confidence image 500 of the sub-image 300. The confidence values are normalized prior to generating the confidence image so that all the values could be identified within a range from 0 to 1. For example, by normalization the values can be more objectively compared to a threshold value. Hence a normalized value makes it possible for a value to be efficiently compared against other values.

At step 110, separated regions of pixels are identified within the confidence image which has a confidence value greater than a threshold confidence value. The threshold value could be set as a fixed percentage of a maximum confidence value. One way of arriving at this confidence value might be by initial training using a training set. The training set might include an equal number of rib-cross and non rib-cross images which are analyzed. Since there is a higher possibility of the rib-cross regions in the image to show a higher confidence value, the threshold level could be a higher percentage value for example, it may be 50%, 80%, 90% or 95% based on the training.

At step 112, a filtered confidence image is generated consisting of the separated regions of the confidence image which are larger than a threshold area. The threshold value could be set at a fixed value or could be a percentage of the largest area in the original image. One way of arriving at this confidence value might be by initial training using a training set. The training set might include an equal number of rib-cross and non rib-cross images which are analyzed. For identifying separated regions of pixels within the confidence image, one of the methods that could be employed is the connected component labeling on the chosen pixels. Connected components labeling scans an image and groups its pixels into components based on pixel connectivity, i.e. all pixels in a connected component share similar pixel intensity values. Once all groups have been determined, each pixel is labeled with a gray level or a color labeling according to the component it was assigned to. Then the threshold value of the area, which has been already determined, could be used to filter the connected area to obtain a filtered confidence image from the confidence image.

Figure 6:
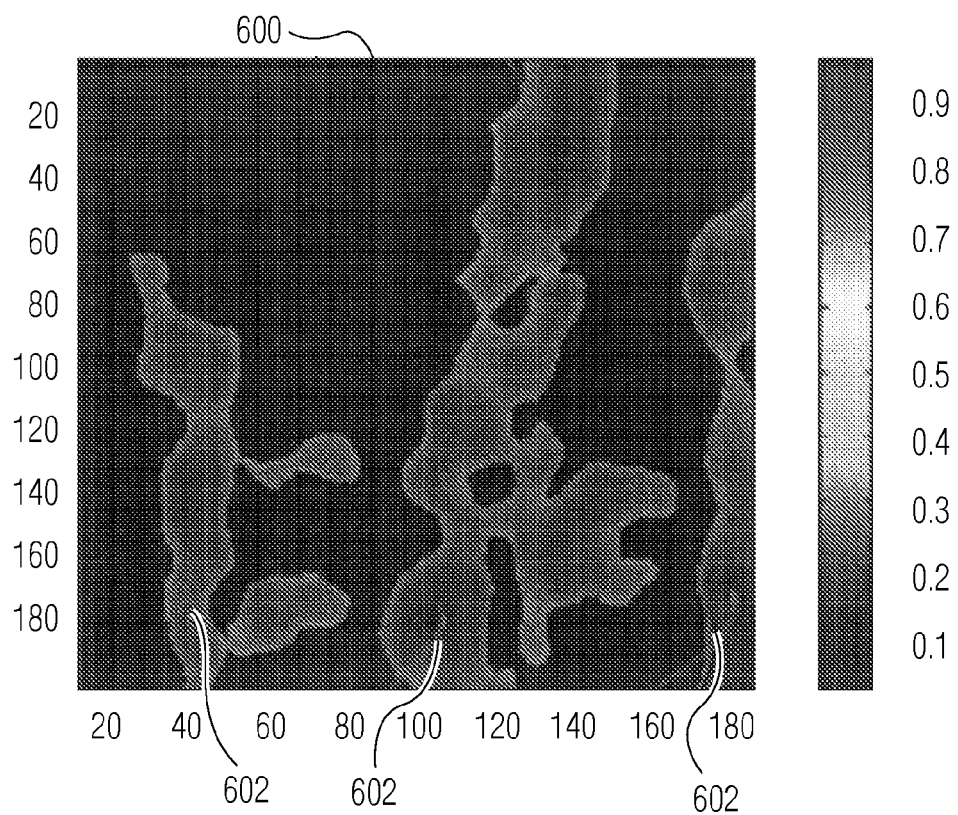
FIG. 6 represents the filtered confidence image of the sub-image as shown in FIG. 2, having a rib-cross.
Figure 7:
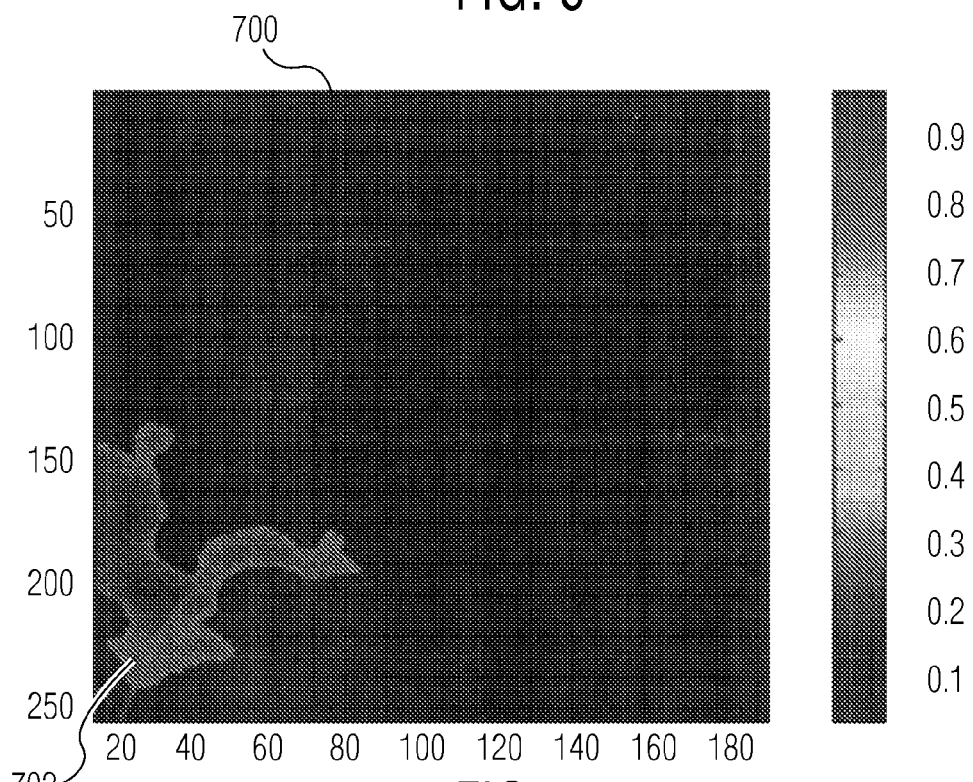
FIG. 7 represents the filtered confidence image of the sub-image as shown in FIG. 3, which does not have a rib-cross.

FIG. 6 represents the filtered confidence image 600 of the confidence image 400 and FIG. 7 represents the filtered confidence image 700 of the confidence image 500. The confidence image 400 of the sub-image 200 has separated regions 602 which are larger than a threshold area. The filtered confidence image 700 also has a small separated region 702, which is larger than the threshold area. It should be noted that the filtered confidence image 600 has more or larger continuous separated regions, which is an indication of the presence of a rib-cross.

At step 114, a histogram is determined based on values characteristic for the matching of the curve. The values characteristic for the matching of the curve could be confidence value, orientation value or a curvature value. As per the example models applied for the matching, the curve used could be a straight-line or a parabolic curve. When using the straight-line model, it is possible to determine an orientation value based on the previously explained equations. An orientation value is determined for every pixel of the sub-image as the orientation of the straight line, which is matched to the respective pixel. Hence in this case the values characteristic for the matching of the curve are orientation values.

When using the parabolic curvature model, the curve used is a parabolic curve and it is possible to determine an orientation value and a curvature value of every pixel of the sub-image respectively as the orientation and curvature of the parabolic curve, which is matched to the respective pixel. Hence in this case, the values characteristic for the matching of the curve are the orientation values or the curvature values.

In the present embodiment, the filtered confidence image is used as a mask. The mask defines which parts of the image it is applied to are taken into consideration and which parts are left out. In this case only those parts are relevant which correspond to connected areas of high confidence as described above.

Figure 8A:
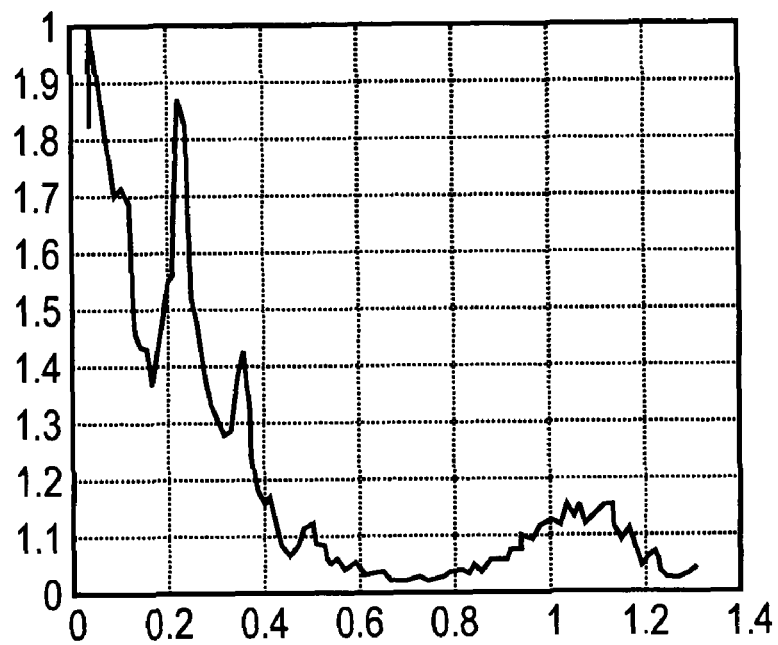
FIG. 8a represents the histogram based on orientation values of an image with a rib-cross, like the one as shown in FIG. 2, FIG. 8b represent the histogram based on confidence values of an image with a rib-cross, like the one as shown in FIG. 2, FIG. 8c represent the histogram based on curvature values of an image with a rib-cross, like the one as shown in FIG. 2.
Figure 8B:
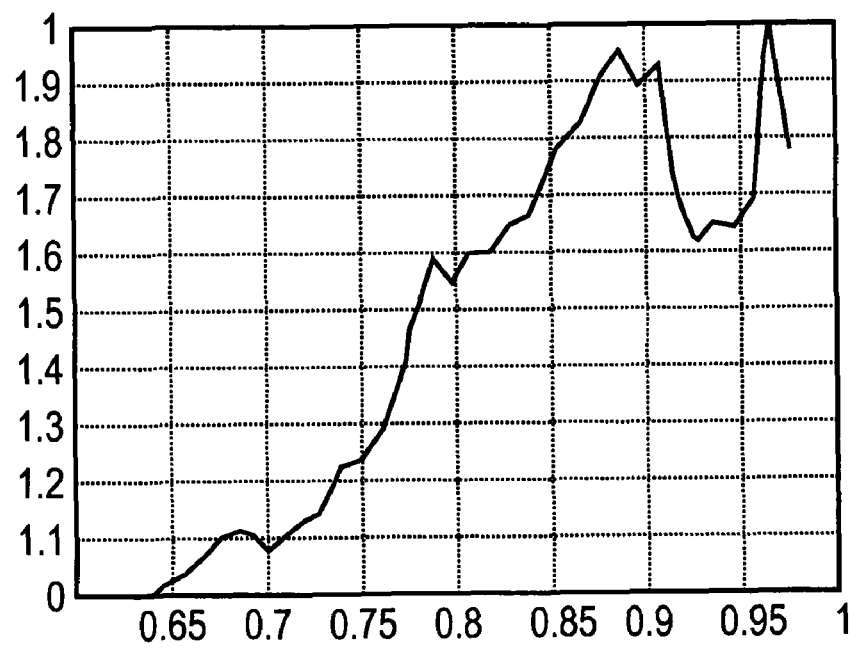
Figure 8C:
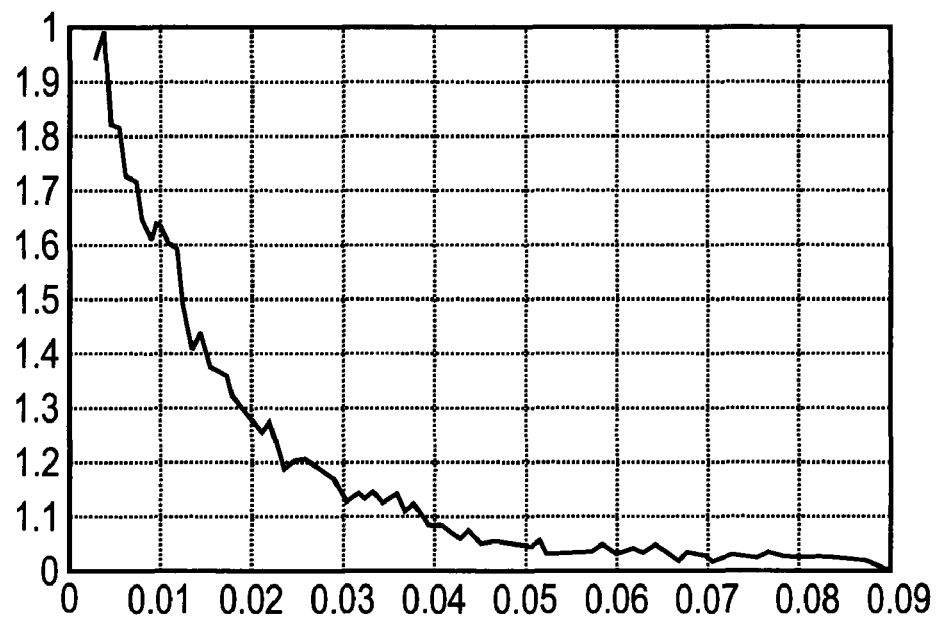
Figure 9A:
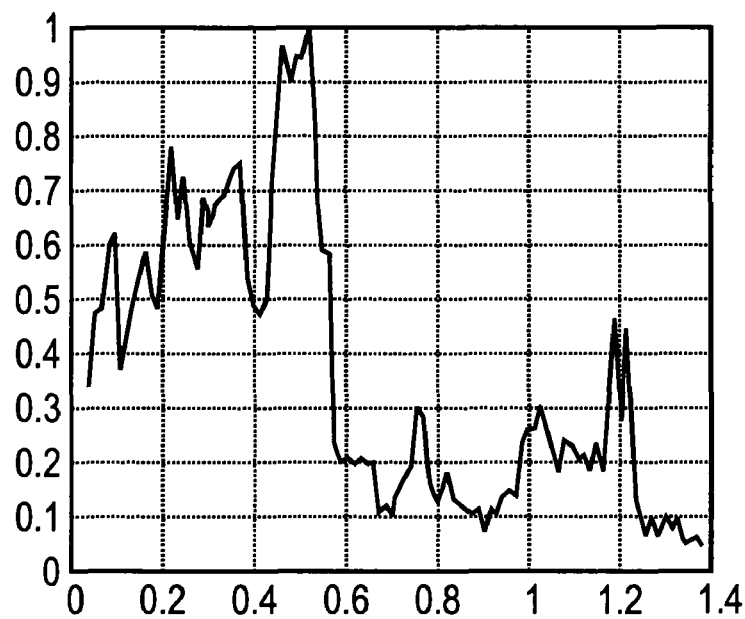
FIG. 9a represents the histogram based on orientation values of an image without a rib-cross, like the one as shown in FIG. 3.
Figure 9B:
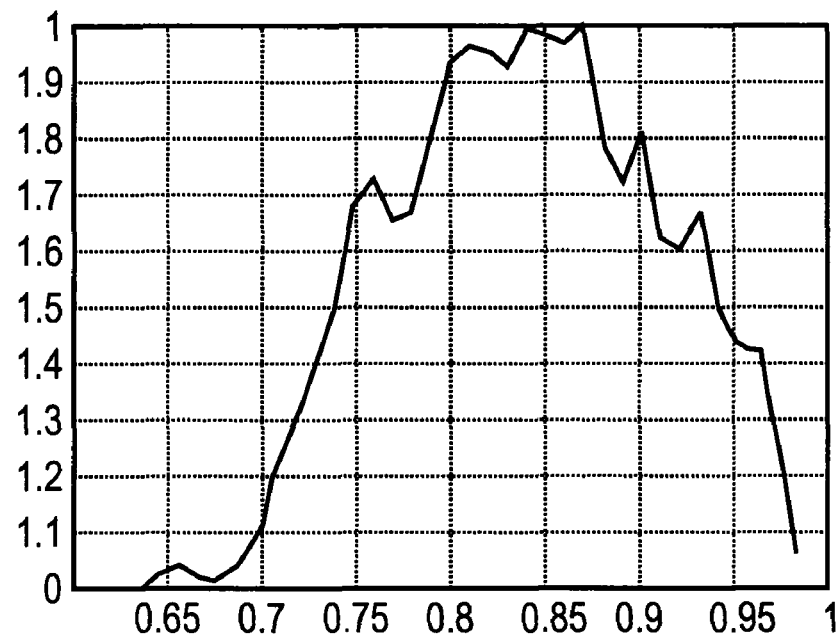
FIG. 9b represents the histogram based on confidence values of an image without a rib-cross, like the one as shown in FIG. 3.
Figure 9C:
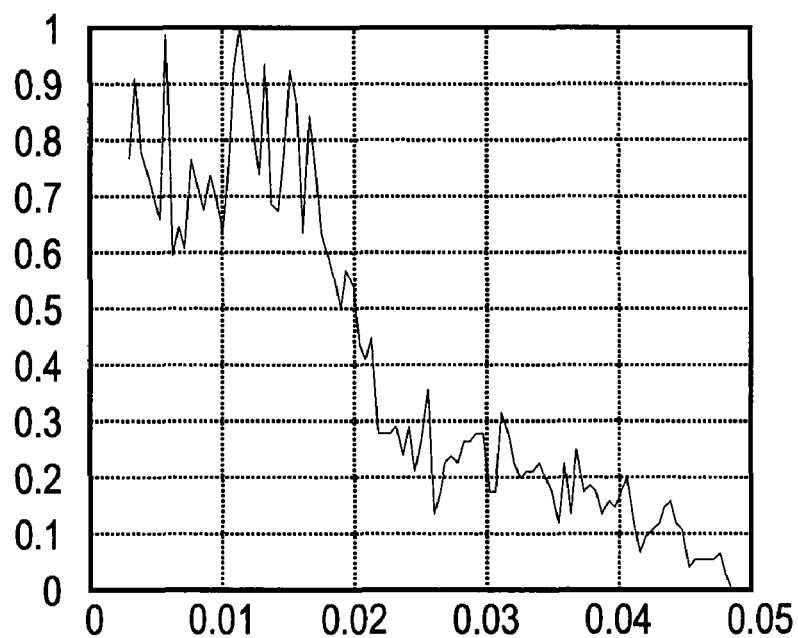
FIG. 9c represents the histogram based on curvature values of an image without a rib-cross, like the one as shown in FIG. 3.

Only those values are considered for the histogram, which correspond to the separated regions of the filtered confidence image. FIGS. 8a, 8b and 8c represent the histogram based on orientation values, confidence values and curvature values respectively for an image with a rib-cross, like the one as shown in FIG. 2. FIGS. 9a, 9b and 9c represent the histogram based on orientation values, confidence values and curvature values respectively for an image without a rib-cross, like the one as shown in FIG. 3. By using the filtered confidence image as a binary mask, pixels of the image which it is applied to are either considered for further analysis or left out completely. This clear distinction has the benefit that any distortions of the image, to which the mask is applied, by a partial transparence of the mask is avoided.

At step 116, the method involves determining a statistical measure of the histogram. The statistical measure determined is for example a mean or standard deviation or skewness from the values characteristic for the matching, e.g. from confidence values or orientation values or the curvature values. Skewness is a measure of the asymmetry of the probability distribution and standard deviation is a measure of the variability of a probability distribution and mean is the average value.

At step 118, the probable lung nodule is verified to be a cross-rib (or not) based on at least one of these statistical measures. The values of the statistical measures show a wide difference for a rib-cross or non rib-cross based sub-images. Practically if the histogram values for each of the statistical measures of a plurality of images having an equal mixture of images having rib-cross or non rib-cross are plotted in a graph, then the features exhibit a good discrimination between rib-cross and non rib-cross values.

Figure 10A:
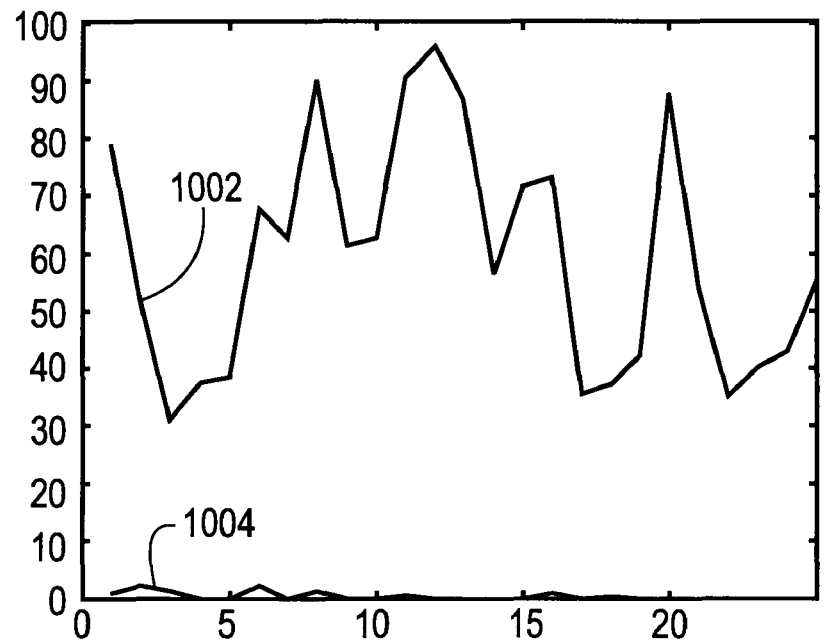
FIG. 10a represents plots for rib-cross and non rib-cross images for a statistical measure, which is the skewness for orientation values based on a straight line model.
Figure 10B:
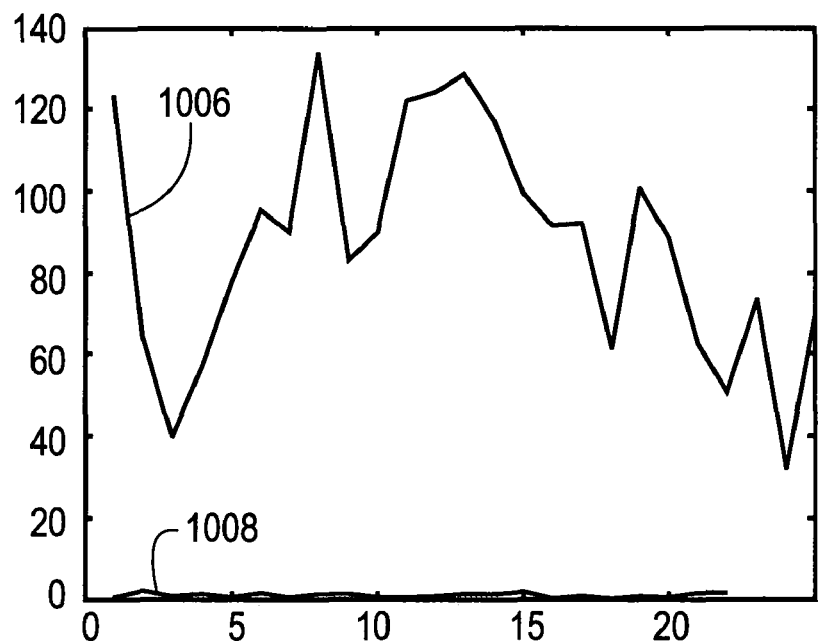
FIG. 10b represents plots for rib-cross and non rib-cross images for a statistical measure, which is the skewness for orientation values based on a parabolic curvature model

FIG. 10a and FIG. 10b represent plots for rib-cross and non rib-cross images for a statistical measure, which is the skewness for orientation values based on a straight line model and a parabolic curvature model respectively. The waveform 1002 and waveform 1006 represents distribution for images having rib-cross and waveform 1004 and waveform 1008 represents distribution for images not having rib-cross.

Figure 11A:
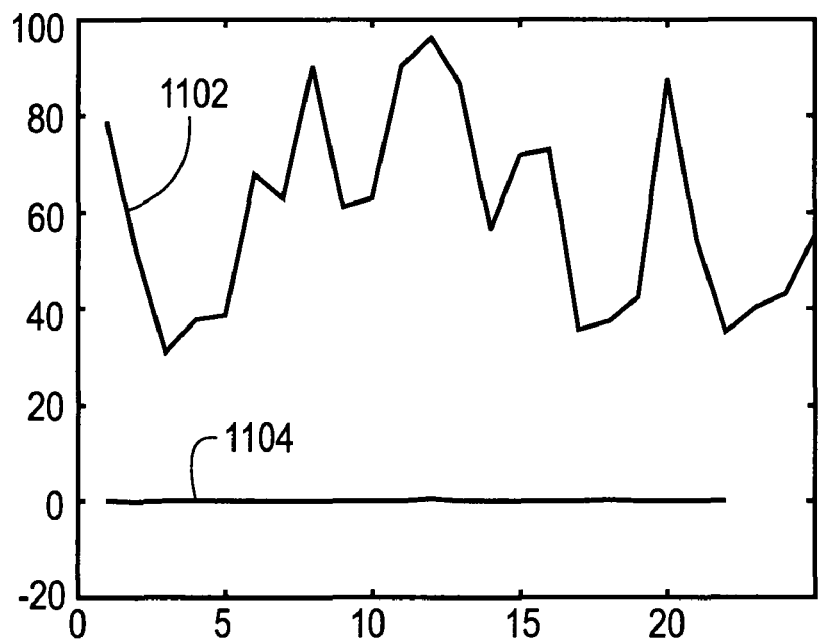
FIG. 11a represents plots for rib-cross and non rib-cross images for a statistical measure, which is the skewness for confidence values based on a straight line model.
Figure 11B:
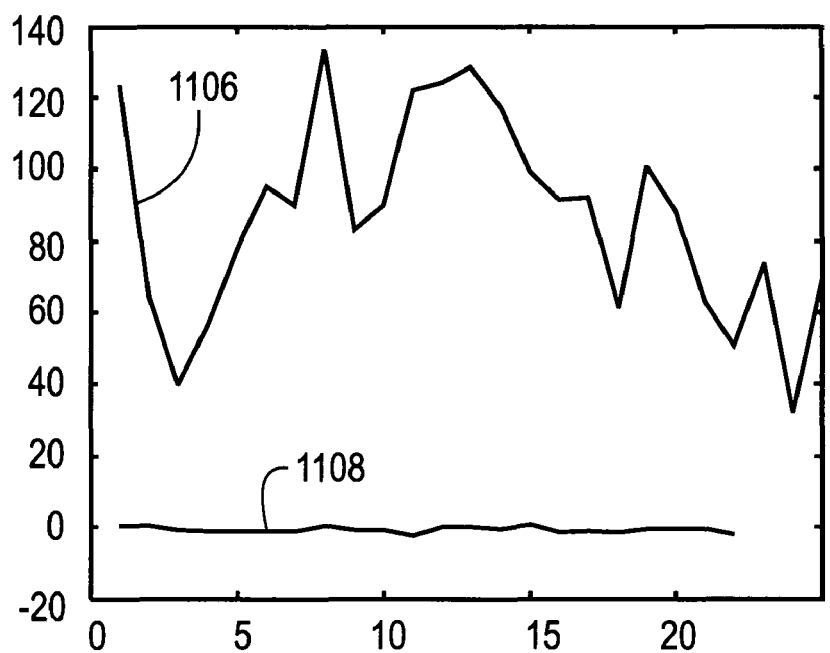
FIG. 11b represents plots for rib-cross and non rib-cross images for a statistical measure, which is the skewness for confidence values based on a parabolic curvature model.

FIG. 11a and FIG. 11b represent plots for rib-cross and non rib-cross images for a statistical measure, which is the skewness for confidence values based on a straight line model and a parabolic curvature model respectively. The waveform 1102 and waveform 1106 represents distribution for images having rib-cross and waveform 1104 and waveform 1108 represents distribution for images not having rib-cross. Similarly, plots can be created for other statistical measures including mean and standard deviation.

FIG. 12 illustrates a system for verifying detection of a lung nodule in a chest radiographic image. The system comprises a candidate generator 1202 for providing a sub-image of the chest radiographic image. The sub-image contains a detected nodule. It is to be verified whether the image actually has a nodule or not and whether the nodule detected is a rib-cross or not. The system also has a matching module 1204 for matching a curve to each pixel of the sub-image. A processor 1206 determines a confidence value for every pixel of the sub-image which is matched in the previous step. The confidence value represents how well the curve is matched to each pixel. The processor 1206 could also determine an orientation value and a curvature value of every pixel of the sub-image. For the straight-line model matching, the processor is adapted to determine the orientation value and for the parabolic curvature model, the processor is adapted to determine the orientation value and a curvature value.

The system comprises of a generator 1208 for generating a confidence image consisting of the confidence values at the position of the respective pixel of the sub-image. The confidence image is fed into an identifier 1210 for identifying separated regions of pixels within the confidence image which have a confidence value greater than a threshold confidence value. A filter 1212 is used for filtering and generating a filtered confidence image consisting of the separated regions of the confidence image which are larger than a threshold area.

An analyzer 1214 then determines a histogram of values characteristic for the matching of the curve wherein the filtered confidence image is used as a mask, such that only values are considered for the histogram which corresponds to the separated regions of the filtered confidence image. A determining module 1216 is used for determining a statistical measure of the histogram. As cited earlier, the statistical measure can include, but in not limited to, mean or standard deviation or skewness. The system further has a verifier 1218 for verifying the detection of the lung nodule based on at least one statistical measure of the histogram.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the embodiments of the present invention as defined.

The invention claimed is:

1. A method for verifying detection of a lung nodule in a chest radiographic image, comprising:
   (a) providing a sub-image of the chest radiographic image, wherein the sub-image contains a detected nodule;
   (b) matching a curve to a plurality of pixels in the sub-image;
   (c) determining a confidence value for individual pixels in the plurality of pixels in the sub-image, wherein the confidence value for each individual pixel represents how well the curve is matched to the individual pixel;
   (d) generating a confidence image consisting of the confidence values at the position of the respective individual pixel;
   (e) identifying separated regions of pixels within the confidence image which have a confidence value greater than a threshold confidence value;
   (f) generating a filtered confidence image consisting of the separated regions of the confidence image which are larger than a threshold area;
   (g) determining a histogram of values characteristic for the matching of the curve wherein the filtered confidence image is used as a mask, such that only values are considered for the histogram which correspond to the separated regions of the filtered confidence image;
   (h) determining at least one statistical measure of the histogram; and
   (i) verifying the detection of the lung nodule based on the at least one statistical measure.

2. A method according to claim 1, wherein the values characteristic for the matching of the curve are the confidence values of the confidence image.

3. A method according to claim 1, wherein the confidence values are normalized prior to generating the confidence image.

4. A method according to claim 1, wherein the curve is a straight-line.

5. A method according to claim 4, further comprising:
   determining an orientation value for each individual pixel as the orientation of a straight line, which is matched to the respective individual pixel, wherein the values characteristic for the matching of the curve are orientation values.

6. A method according to claim 1, wherein the curve is a parabolic curve.

7. A method according to claim 6, further comprising:
   determining an orientation value and a curvature value for individual pixels as the orientation and curvature of the parabolic curve, which is matched to the respective individual pixel, wherein the values characteristic for the matching of the curve are the orientation values or the curvature values.

8. A method according to claim 1, wherein the filtered confidence image is used as a binary mask when determining the histogram.

9. A method according to claim 1, wherein the statistical measure determined is a mean derived from the values characteristic for the matching.

10. A method according to claim 1, wherein the statistical measure determined is a standard deviation derived from the values characteristic for the matching.

11. A method according to claim 1, wherein the statistical measure determined is a skewness derived from the values characteristic for the matching.

12. A method for verifying detection of a lung nodule in a chest radiographic image, comprising:
   (a) providing a sub-image of the chest radiographic image, wherein the sub-image contains a detected nodule;
   (b) matching a curve to a plurality of pixels in the sub-image;
   (c) determining a confidence value for individual pixels in the plurality of pixels in the sub-image, wherein the confidence value for each individual pixel represents how well the curve is matched to the individual pixel;
   (d) generating a confidence image consisting of the confidence values of the orientation values at the position of the respective individual pixel;
   (e) identifying separated regions of pixels within the confidence image which have a confidence value greater than a threshold confidence value;
   (f) generating a filtered confidence image consisting of the separated regions of the confidence image which are larger than a threshold area;
   (g) determining a histogram of the filtered confidence image;
   (h) determining at least one statistical measure of the histogram;
   (i) verifying the detection of the lung nodule based on the at least one statistical measure.

13. A method according to claim 12, wherein the curve is a straight-line or a parabolic curve.

14. A method according to claim 12, wherein the statistical measure determined is at least one of a mean, standard deviation and skewness derived from the confidence values.

15. A system for verifying detection of a lung nodule in a chest radiographic image, comprising:
   (a) a candidate generator for providing a sub-image of the chest radiographic image, wherein the sub-image contains a detected nodule;
   (b) a matching module for matching a curve to a plurality of pixels in the sub-image;
   (c) a processor for determining a confidence value for individual pixels in the plurality of pixels in the sub-image, wherein the confidence value for each individual pixel represents how well the curve is matched to the individual pixel;
   (d) a generator for generating a confidence image consisting of the confidence values at the position of the respective individual pixel;
   (e) an identifier for identifying separated regions of pixels within the confidence image which have a confidence value greater than a threshold confidence value;
   (f) a filter for generating a filtered confidence image consisting of the separated regions of the confidence image which are larger than a threshold area;
   (g) an analyzer for determining a histogram of values characteristic for the matching of the curve wherein the filtered confidence image is used as a mask, such that only values are considered for the histogram which correspond to the separated regions of the filtered confidence image;
   (h) determining module for determining at least one statistical measure of the histogram; and (i) a verifier for verifying the detection of the lung nodule based on at least one statistical measure of the histogram.

16. The system according to claim 15, wherein the curve is a straight-line.

17. The system according to claim 16, wherein the processor further determines an orientation value for individual pixels as the orientation of the straight line, which is matched to the respective individual pixel, wherein the values characteristic for the matching of the curve are orientation values.

18. The system according to claim 15, wherein the curve is a parabolic curve.

19. A system according to claim 18, wherein the processor further determines an orientation value and a curvature value for individual pixels as the orientation and curvature of the parabolic curve, which is matched to the respective individual pixel, wherein the values characteristic for the matching of the curve are the orientation values or the curvature values.

20. A system according to claim 15, wherein the statistical measure determined is at least one of a mean, standard deviation and skewness derived from the values characteristic for the matching of the curve.

* * * * *